United States Patent
Bulin et al.

(10) Patent No.: US 8,932,016 B2
(45) Date of Patent: Jan. 13, 2015

(54) DEICING DEVICE FOR PROPFAN-TYPE PROPELLER BLADES

(75) Inventors: Guillaume Bulin, Blagnac (FR); Jean-Michel Rogero, Toulose (FR); Christian Fabre, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 638 days.

(21) Appl. No.: 13/318,505

(22) PCT Filed: May 3, 2010

(86) PCT No.: PCT/FR2010/050842
§ 371 (c)(1),
(2), (4) Date: Jan. 19, 2012

(87) PCT Pub. No.: WO2010/128240
PCT Pub. Date: Nov. 11, 2010

(65) Prior Publication Data
US 2012/0107133 A1    May 3, 2012

(30) Foreign Application Priority Data
May 5, 2009    (FR) .................................... 09 52967

(51) Int. Cl.
*F01D 5/18*    (2006.01)
*B64C 11/48*    (2006.01)
(Continued)

(52) U.S. Cl.
CPC ............... *B64C 11/48* (2013.01); *B64D 15/04* (2013.01); *B64D 2027/026* (2013.01); *Y02T 50/66* (2013.01)
USPC .............................. 416/39; 416/93 R; 416/94

(58) Field of Classification Search
USPC ............ 415/47, 175, 176, 177; 416/39, 90 R, 416/91, 92, 90 A, 93 R, 94, 95
See application file for complete search history.

(56) References Cited

U.S. PATENT DOCUMENTS

| 2,440,115 A | 4/1948 | Palmatier |
| 2,586,054 A | 2/1952 | Jonas |

(Continued)

FOREIGN PATENT DOCUMENTS

| DE | 38 28 834 | 11/1989 |
| FR | 2 645 499 | 10/1990 |

OTHER PUBLICATIONS

U.S. Appl. No. 13/318,505, filed Nov. 2, 2011, Bulin, et al.
(Continued)

*Primary Examiner* — Edward Look
*Assistant Examiner* — Aaron Eastman
(74) *Attorney, Agent, or Firm* — Oblon, Spivak, McClelland, Maier & Neustadt, L.L.P.

(57) ABSTRACT

A deicing device for propfan-type aircraft propulsion unit blades, wherein the propulsion unit includes a turbomachine that drives in rotation at least one rotor including a plurality of blades arranged around an annular crown moving with the blades, which forms with its outer wall part of an outer envelope of the propulsion unit, the outer envelope being subjected to atmospheric conditions outside the propulsion unit, the turbomachine generating a flow of hot gases that exit via an annular vein, which is concentric with the moving annular crown, and defined for part of its surface by the inner wall of the moving annular crown. The deicing device includes: a mechanism capturing thermal energy from the annular vein, within the moving annular part; a mechanism transferring thermal energy towards the rotor blades; and a mechanism distributing the thermal energy onto at least a part of the surface of the blades.

11 Claims, 4 Drawing Sheets

Figure 1:
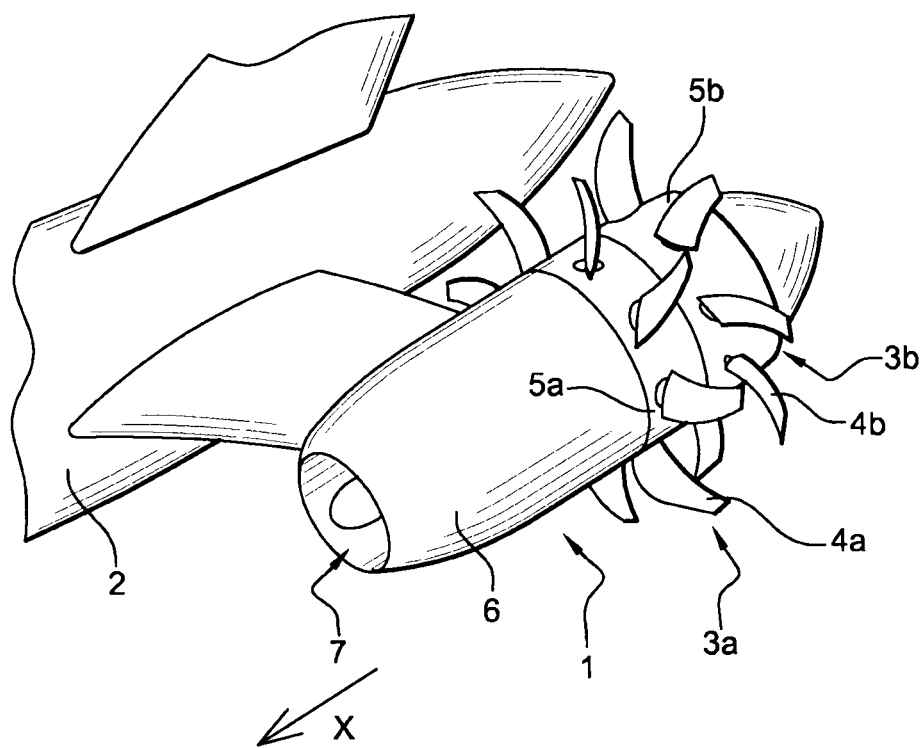

(51) Int. Cl.
*B64D 15/04* (2006.01)
*B64D 27/02* (2006.01)

(56) References Cited

U.S. PATENT DOCUMENTS 4,944,655 A * 7/1990 Merz ............................. 416/61

4,999,994 A 3/1991 Ru/d et al.
5,112,191 A * 5/1992 Strock et al. .................... 416/94

OTHER PUBLICATIONS

International Search Report Issued Dec. 21, 2010 in PCT/FR10/050842 Filed May 3, 2010.

* cited by examiner

DEICING DEVICE FOR PROPFAN-TYPE PROPELLER BLADES

The present invention falls within the field of aeronautical equipment. It concerns more specifically deicing devices. In this case, it relates in particular to the problem of deicing propeller blades.

During the various phases of flight, particularly on the ground, at take-off, climbing or landing, aircraft are regularly subjected to icing atmospheric conditions (cold surface+ambient humidity), which cause ice deposits to be created on various parts of the aircraft. These ice deposits modify the aircraft's aerodynamic performance, increase its mass and reduce its maneuverability.

Various anti-icing devices (that prevent ice forming on a surface of the aircraft) and deicing devices (that detach pieces of ice once they have formed) have been developed over decades and are already known to experts. For example, for the leading edges of wings, they use heating resistors that cause the ice to melt and to break into pieces removed by the airflow. In the same way, inflatable membranes are used intermittently to break ice while it is forming.

It is obvious that similar problems of fighting icing by anti-icing or deicing occur for the propeller blades in the case of propeller-driven airplanes.

In addition, when ice blocks break away from these propellers, they then possess considerable kinetic energy and could damage the rest of the aircraft, for example the fuselage, which only has limited impact resistance.

In this case, heating resistors are generally used, with an electrical generator installed in the propeller shaft and a transfer of current towards cables passing through this shaft towards the various blades. Most often, deicing is cyclical to reduce the amount of electrical power used.

Frequently in this case, rotating contact devices are used that ensure the transmission of electrical power between two parts that are mobile in respect to each other, by using electroconductive brushes fixed to a fixed part that slide on a track, annular for example, of the rotating part.

In the case of propulsion units known under the generic name "propfan", comprising two counter-rotating propellers with an open rotor (not faired) driven by a differential gearbox which is itself driven by a turbomachine, the propellers are arranged in annular fashion around the core of this turbomachine and, in practice, this arrangement prevents the use of the devices mentioned previously.

One of the main drawbacks of these rotating contact systems is linked to the speed of the brushes in relation to the moving track, this speed depending naturally on the diameter of the annular track and on the speed of rotation of this part.

The consequence of this for all these rotating contact systems is rapid wear of the brushes, leading to reduced performance and a requirement for frequent and costly maintenance. The absence of lubrication for these brushes (for reasons of complexity) also contributes to reducing this lifespan significantly.

In the case of the front propeller of a propfan, the diameter of the turbomachine's core leads to a relative speed of the moving part in relation to the stationary part of the order of four hundred meters per second, which makes systems using brushes and a moving track unusable in practice as this exceeds the specifications of devices available on the market.

The situation is further exacerbated in the case of propfans by the counter-rotating characteristic of the two propellers, which leads to a relative speed of eight hundred meters per second between them, at the place where a device with brushes and conducting tracks would have to be installed.

The objective of the present invention is therefore to propose a device for deicing/anti-icing of blades for propfan-type propulsion units, which avoids the drawbacks mentioned above.

To this end, the invention envisages a deicing device for propfan-type aircraft propulsion unit blades, where said propulsion unit comprises a turbomachine that drives in rotation, through a transmission system that may include a reducer or a gearbox, at least one rotor consisting of a plurality of blades arranged around an annular crown moving with these blades, which forms with its outer wall part of the outer envelope of the propulsion unit, said outer envelope being subjected to the atmospheric conditions outside the propulsion unit, said turbomachine generating a flow of hot gases that exit via an annular vein, which is concentric with the moving annular crown, and defined for part of its surface by the inner wall of said moving annular crown, the deicing device comprising:
means of capturing the thermal energy from the hot vein, within the moving annular part,
means of transferring thermal energy towards the rotor blades,
means of distributing the thermal energy onto at least a part of the surface of said blades.

According to various arrangements that may be used in conjunction,
the means of capturing the thermal energy comprise at least one hot air drawing point at the annular hot vein.
the means of transferring thermal energy towards the rotor blades are designed to take into account the rotation of the blade around its longitudinal axis when its settings are changed.
the means of distributing the thermal energy comprise a hot air distribution duct that supplies a series of hot air ejectors arranged on at least part of the blade surface.

According to this last arrangement, to cut the ice into pieces of a predefined maximum size, at least part of the hot air ejectors are located along the leading edge as well as on each side of the blade, along a set of segments
that extend from the leading edge on part of the blade's width,
preferably parallel, and set apart one from the other at predefined distances.

In this case, preferably, each segment is substantially perpendicular to the local tangent of the blade's leading edge.

Still in this case, on each segment and on the leading edge of the blade, ejectors are provided in the surface of the forward part of the blade at regular intervals.

According to an advantageous embodiment, the device comprises also at least one cold air collection point to achieve a temperature compliant with a predefined range.

To take into account the nature of the gases circulating within the hot air vein, the device can advantageously comprise an impurity filter upstream from the hot air collection point.

The invention also envisages a propulsion unit rotor deicing device that comprises, for each blade, a deicing device as described above.

According to another aspect, the invention envisages an aircraft comprising at least one device such as described.

Figure 4:
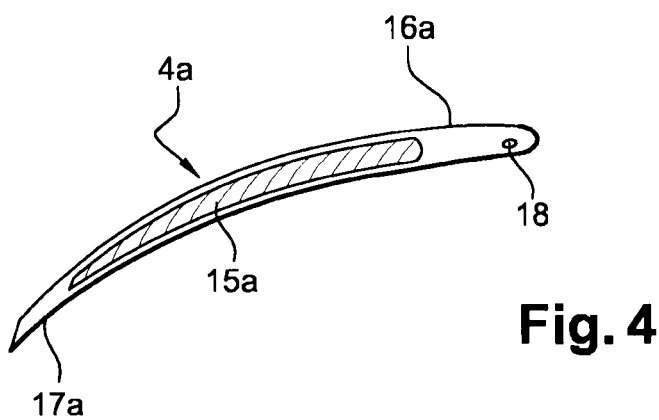
Figure 2:
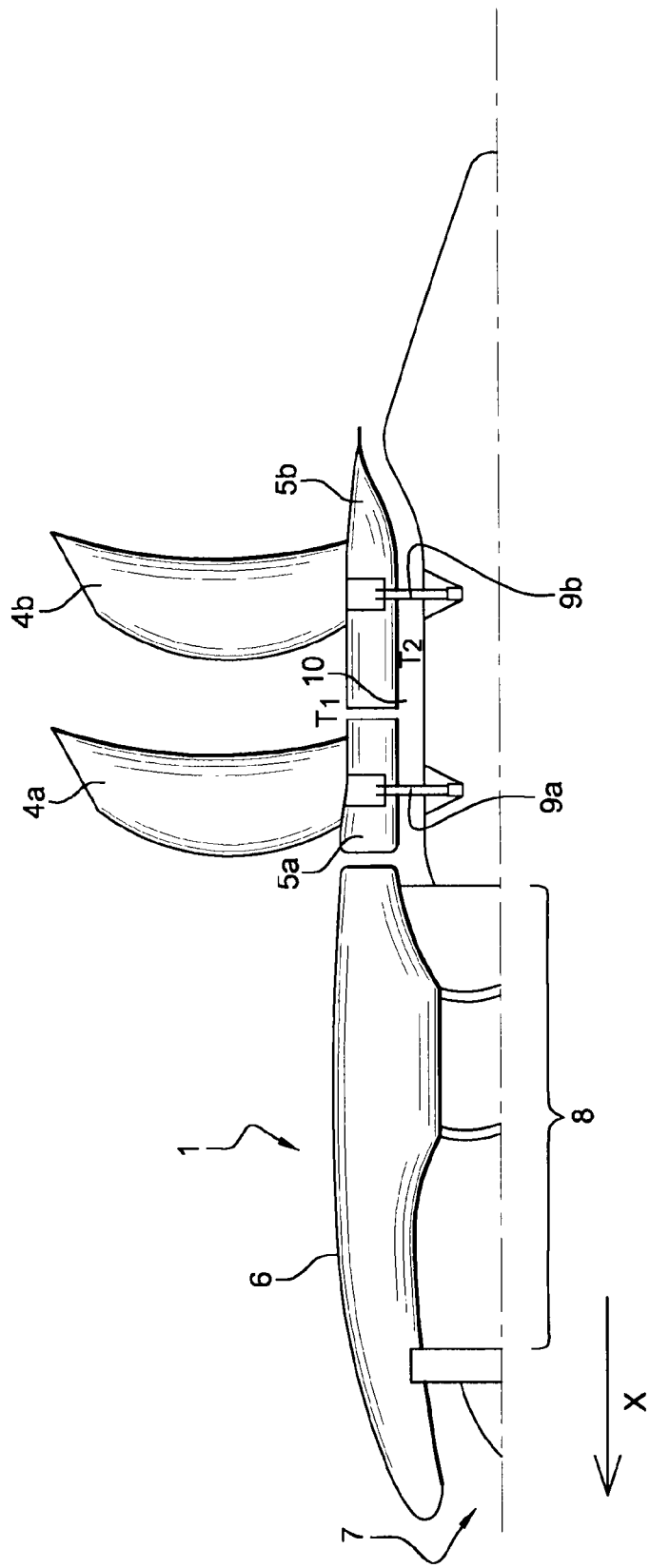
Figure 3:
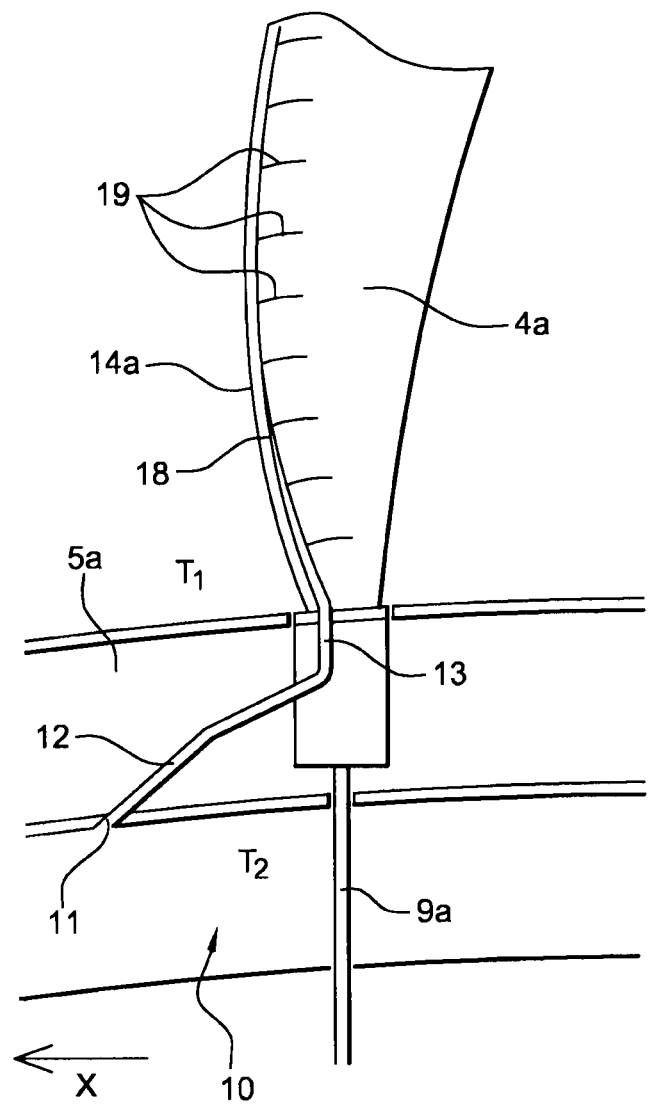
Figure 5:
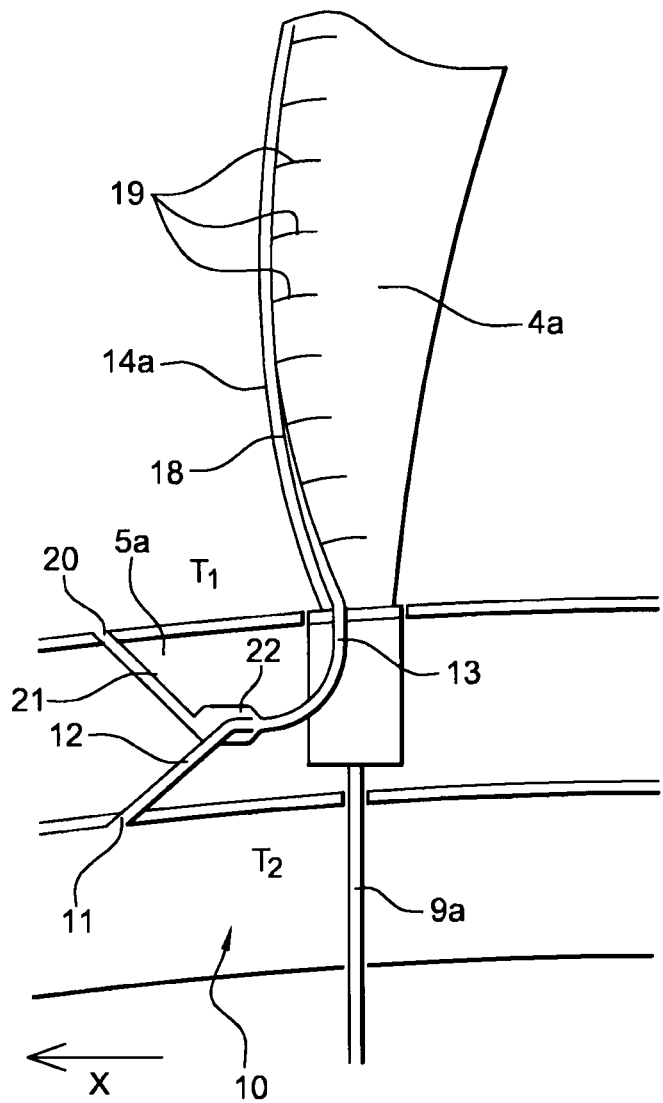

The description that follows, given solely as an example of an embodiment of the invention, is made with reference to the figures included in an appendix, in which:

FIG. 1 shows a propfan-type propulsion unit to which the invention can be applied, FIG. 2 illustrates such a propulsion unit in a very schematic cross-section view, FIG. 3 is a schematic illustration of the main elements making up the device according to the invention, FIG. 4 illustrates schematically a section of a rotor blade, FIG. 5 illustrates a variant of the deicing device according to the invention.

The invention is destined to be used in an airplane propulsion unit 1, for example of the type called "propfan", as shown in FIG. 1. Such propulsion units are envisaged for future aircraft. In the example of implementation illustrated here, two propfan propulsion units 1 are attached by propulsion unit pylons, on both sides of the rear part of an aircraft fuselage 2.

Each propfan propulsion unit 1 comprises here two counter-rotating rotors 3a, 3b each comprising a set of blades 4a, 4b, which are equidistant and arranged at the rear of the propulsion unit 1. The blades 4a, 4b of each rotor 3a, 3b protrude from an annular crown 5a, 5b, which is mobile with this rotor, the outer surface of which is located in the continuity of the outer envelope 6 of the propulsion unit.

As shown schematically in FIG. 2 the propfan propulsion unit 1 comprises an air inlet 7 that supplies a turbomachine 8. This turbomachine 8 comprises an axial portion driven in rotation when the turbomachine is running. In turn, this shaft drives the shafts 9a, 9b of the blades 4a, 4b of the two counter-rotating rotors 3a, 3b via mechanical transmissions not shown in FIG. 2.

The hot gases generated by the turbomachine 8 when in operation are discharged through an annular hot vein 10 having its outlet located at the rear of the two rotors 3a, 3b.

The realization details of propfans and their components—rotors, turbomachine, transmission—as well as their dimensions, materials etc. are beyond the scope of the present invention. The elements described here are therefore provided only for information purposes, to facilitate understanding of the invention in one of its non-limiting examples of implementation.

As is apparent from the description above, during the aircraft's flight, outside air, at a temperature of between +15° C. near the ground and −50° C. at altitude, circulates along the annular crowns 5a, 5b of the propellers, substantially in the direction opposite to the longitudinal axis X of movement of the aircraft.

At the same time, the gases circulating within the hot air vein 10 are at a temperature usually ranging between 600 and 800° C.

The deicing device according to the invention takes advantage of this temperature within the hot air vein 10 to heat at least part of the surface of the rotor blades, but mainly to cut any ice deposit into segments with sufficiently low kinetic energy to not damage the aircraft.

Indeed, the propulsion unit generates at least 200 kW of thermal power, evacuated via the annular hot air vein 10. The relative pressure in this hot air vein 10 is of the order of 0.5 to 1 bar.

The deicing device for rotor blades according to the invention (FIG. 3) is described here for the forward rotor 3a of the propulsion unit under consideration. An identical device is envisaged for the aft rotor 3b.

The device comprises firstly, for one or several blades 4a of the rotor 3a, a hot air collection point 11 at the annular hot air vein 10. With at least one per rotor. In the example described here, this hot air collection point 11 is located slightly upstream of the blade 4a.

It should be noted for the remainder of the description that each blade 4a is linked to a substantially similar deicing device.

These air collection points 11 are therefore arranged in regular angular fashion (e.g. every 30° for a rotor comprising twelve blades) on the inner surface of the annular crown 5a. They are known to experts and have, for example, a diameter of 10 mm to supply a maximum flow of approximately 0.05 kg/s, depending also on the number and diameter of the ejectors placed on the linked blade.

The air collected at the air collection point 11 is channeled by a duct 12 towards the shaft 9a of the blade 4a. This duct 12 is preferably flexible over at least part of its length, so as to be able to adapt to the angular movement of the blade 4a around the shaft 9a when its settings are changed. This duct 12 can, for example, be made (in part at least) of high-temperature resistant metal pipe. Alternatively, when feasible, the duct can be inserted at the rotational center of the blade's shaft and to have a junction that allows rotation on the blade pitch displacement.

The duct 12 is followed within the shaft 9a of the blade 4a by a channel 13, preferably wrapped in thermal insulation, which end at the foot of the leading edge 14a of the blade.

As can be seen in FIG. 4, the blade 4a comprises, in this non-limiting example, a core 15a made of thermoplastic or thermosetting resin composite material, as well as a forward part 16a made of metal alloy (e.g. titanium alloy) and a trailing edge 17a, also made in the form of a metal part.

The channel 13 is prolonged by a distribution duct 18, installed in the forward part 16a of the blade 4a and matches substantially the shape of said blade's leading edge 14a.

This distribution duct 18 supplies a set of hot air ejectors (not detailed in the figures), located along the leading edge 14a, as well as, on either side of the blade 4a, along a set of segments 19 preferably parallel and equidistant from one another by five to ten centimeters, each of the segments extending from the leading edge and being five to fifteen centimeters long, but not exceeding in any case the width of the forward part 16a of the blade, because of the limited temperatures supported by the composite materials in the core 15a of the blade 4a, if the blade should be made of composite material.

In this example, each segment 19 is substantially perpendicular to the local tangent the blade's leading edge 14a.

On each segment 19 and on the leading edge 14a, ejectors are provided within the surface of the forward part 16a of the blade at regular intervals, e.g. two centimeters. Each of these ejectors has a diameter of one or two millimeters.

When the propulsion units 1 are started, the hot air vein 10 is immediately filled with hot air (air and burnt gases, in fact) at a pressure of 0.5 to 1 bar relative and a temperature of 600° C., approximately.

As of this moment, air collected for each blade 4a by the collection points 11 circulates in the tubes 12, 13, 18 and supplies the ejectors along the lines of the leading edge and the segments 19, making impossible the formation of ice locally. This, then, is a local anti-icing function.

During the flight of the airplane, the air ejected by the ejectors forms a film of hot air that follows the local limit layer on the blade.

The device can either remain in operation permanently, whatever the atmospheric conditions and the current flight phase, or it can be fitted with a valve system that allows the air collection to be stopped and therefore allows the pilot to control the system's operation.

In case of icing conditions, the possible ice cannot form on the leading edge 14a or on the segments 19. Therefore, ice can only form on a limited surface, defined by the distance between the segments 19, typically five to ten centimeters. The mass of ice that can accumulate on the blade is also reduced.

In addition, the ice blocks thus segmented tend to be pushed away spontaneously by the effect of the airflow and of the centrifugal force exerted by the movement of the blade 4a. Their limited dimensions reduce their kinetic energy as well as the risks of damage created by these blocks in the case where, after detaching, they hit the airplane's fuselage.

It is apparent from the description that the deicing device according to the invention removes the problems caused typically by electrical devices that require fast rotating contacts such as used in the previous state of the art. This facilitates the maintenance of the blade deicing mechanism.

This device utilizes an energy resource that is essentially lost, by taking advantage of the heat generated by the propulsion unit that passes under the annular crown 5a of the rotor.

The flow required to deice the blades 4a, of the order of 0.05 kg/s per propulsion group, is very small in comparison with the volume of air that circulates in the hot air vein 10.

The scope of this invention is not limited to the details of the embodiments considered above as an example, but on the contrary extends to modifications in the reach of the expert.

In one realization variant, illustrated in FIG. 5, the device also comprises, for each blade 4a, a cold air collection point 20 at the outer surface of the annular crown 5a. The air is then channeled by a tube 21 towards a jet-pump 22, of a type known per se, in which the hot air flow coming from the high pressure (six to eight bar) hot air collection point 11, causes cold air to be aspirated from the cold air collection point 20.

In this way, depending on the sizing of the collection points and the jet-pump device, it is possible to ensure a known mix of the hot and cold air volumes, so as to deice the blades with air that does not exceed a maximum level, e.g. 200° C., which is acceptable for the material that makes up the blades, particularly when these blades are made of composite materials.

In this variant, the cold air collection point 20 can also be deiced by a derivation made on tube 12 so as to always keep the cold air intake operational.

Preferably, in this variant, the hot and cold air volumes mixed by the jet-pump 22 are regulated by a flow limiter unit controlled by an electronic control unit, depending on the temperature measured in the hot air vein, in outside air and in air circulating in the distribution duct 18.

Alternatively, this temperature regulation can be carried out without a control unit by using a thermo-mechanical system in the mixed airflow, whose deformation depending on temperature allows the air intakes to be regulated. This device eliminates the need for an electrical power source within the rotor.

The description has been made considering that each blade is fitted with an identical and separate deicing device. It is clear that it is also possible to choose a device in which a smaller number of hot air (and possibly cold air) collection points supply all the blades (potentially via one or more jet-pumps) for deicing.

Many variants of layout for the hot air ejector lines can of course be envisaged; for example: using two lines of hot air ejectors on either side of the leading edge instead of a single line on the leading edge itself, or modifying the shape or orientation of the segments 19 in relation to the leading edge 14a line.

It is clear that the area at the foot of the blade is where it is most desirable to avoid the formation of ice, as the ice blocks from this area acquire maximum kinetic energy because of the slingshot effect when they detach from the blade. It can then be envisaged to bring the segments 19 closer in this area at the foot of the blade, or to increase the diameter and therefore the hot air flow coming out of the ejectors located on these segments.

In the same way, to avoid load losses that reduce the flow towards the end of the blade, the device can comprise several parallel distribution ducts 18, coming from the end of the channel 13, each supplying a series of ejector segments.

In another variant, to take the impurity content (combustion by-products, unburnt fuel, etc.) of air from the collection point 11 on the hot air vein 10 into account, the device comprises a filter of known type on the duct 12.

The invention claimed is:

1. A deicing device for propfan-type aircraft propulsion unit blades, wherein the propulsion unit includes a turbomachine that drives in rotation, through a transmission system, at least one rotor including a plurality of blades arranged around an annular crown moving with the blades, which forms with an outer wall of the annular crown part of an outer envelope of the propulsion unit, the outer envelope being subjected to atmospheric conditions outside the propulsion unit, the turbomachine generating a flow of hot gases that exit via a substantially annular vein, which is concentric with the moving annular crown, and defined in part by an inner wall of the moving annular crown, the deicing device comprising:
at least one hot air collection point that captures thermal energy from the annular vein, the at least one hot air collection point being on the inner wall of the annular crown;
a duct that transfers the thermal energy from the annular vein towards the blades; and
means for distributing the thermal energy onto at least a part of a surface of the blades.

2. A deicing device according to claim 1, wherein the duct is configured to take into account rotation of the blades around its a longitudinal axis when a setting of the blades is changed.

3. A deicing device according to claim 1, wherein the means for distributing the thermal energy comprises a hot air distribution duct that supplies a series of hot air ejectors arranged on at least part of the surface of the blades.

4. A deicing device according to claim 3, wherein at least part of the hot air ejectors are located along a leading edge and on each side of the blades, along a set of segments that extend from the leading edge on part of the blade's width, and are set apart one from the other at predefined distances.

5. A deicing device according to claim 4, wherein each segment is substantially perpendicular to a local tangent of the leading edge.

6. A deicing device according to claim 4, wherein on each segment and on the leading edge, ejectors are provided within a surface of a forward part of the blades at regular intervals.

7. A deicing device according to claim 1, further comprising:
at least one cold air collection point and means for mixing hot and cold air to achieve a temperature compliant with a predefined range.

8. A deicing device according to claim 7, wherein the at least one cold air collection point is on the outer wall of the annular crown, and the means for mixing the hot and the cold air is a jet-pump that aspirates the cold air with the hot air.

9. A deicing device for a propulsion unit rotor wherein each blade comprises a deicing device according to claim 1.

10. An aircraft comprising a deicing device according to claim 1.

11. A deicing device according to claim 1, wherein the duct is flexible over at least part of a length of the duct.

* * * * *